United States Patent Office 3,158,199
Patented Nov. 24, 1964

3,158,199
TREATMENT OF SUBTERRANEAN FORMATIONS
Warren E. Parkhurst, Dallas, Tex., assignor, by mesne assignments, to Socony Mobil Oil Company, Inc., New York, N.Y., a corporation of New York
No Drawing. Filed Aug. 11, 1955, Ser. No. 527,865
8 Claims. (Cl. 166—42)

This invention relates to the treatment of subterranean formations and relates more particularly to treatment of earth formations containing petroleum to improve the petroleum producing characteristics of the formations.

Petroleum oil is produced from a petroleum-containing subterranean formation by flow of the oil from the formation to a well bore hole drilled from the surface of the earth to the formation. The rate and often the total amount of petroleum oil production from the formation depends to a large extent upon the fluid saturation conditions within the formation in the vicinity of the well bore hole. The formation in addition to containing oil will contain water which may be connate water, or water occurring naturally in the formation, or which may be water which has invaded the formation as a result of filtration through the walls of the well bore hole from the aqueous drilling fluid employed during drilling of the well. This water within the formation tends as an effect of various causes to accumulate in the formation in the neighborhood of the well bore hole with adverse effect on the petroleum oil production. Correction or reduction of the adverse effect of the fluid distribution conditions has been proposed by means involving the use of surface active agents. These agents have been intended to operate through mechanisms involving changes in the surface tension of the water within the formation or in the oil-water wettability characteristics of the formation. However, while improvement in petroleum oil production can be effected with these agents, their use has been limited by the fact that satisfactory results are obtained in a limited number of instances.

It is an object of this invention to treat a subterranean formation. It is another object of this invention to change the fluid distribution conditions in a petroleum-containing subterranean formation in the neighborhood of a well bore hole. It is another object of this invention to improve production of petroleum oil from subterranean formations. It is another object of this invention to increase the number of instances where petroleum oil production is improved by treatment of the subterranean formation. These and further objects of the invention will become apparent from the following detailed description.

In accordance with the invention, a subterranean formation is subjected to the action of a solution in oil of polyoxyethylene ether of nonyl phenol having an oxyethylene chain containing between 1 and 6 moles of ethylene oxide.

It is not intended to limit the invention to the consequences of any theory. However, it would appear that fluid distribution conditions adversely affecting petroleum oil production arise from the presence of connate water and drilling fluid filtrate and the oil-water wettability characteristics of the formation. The presence of emulsions of oil and water also adversely affects petroleum oil production. The flow of oil through a subterranean formation containing water which, in the case of the connate water, is unavoidably present, occurs most easily by flow through interstices ringed by the water. The interstices will be ringed with the water where the formation is preferentially water wet. However, where the formation is preferentially oil wet, the oil will be ringed along the surfaces of the interstices with the water distributed centrally of the oil-ringed interstices. Under these circumstances, oil flow is impeded since the oil rather than the water, as in the case of water wet formations, preferentially enters the smaller interstices where flow does not occur as readily. With greater amounts of water in the formation this effect is aggravated and greater amounts of water impede the flow of oil, even in water-wet formations, by restricting the cross-sectional areas of the interstices available for oil flow. The amount of water in the formation has a further effect on the flow of oil arising from the interfacial tension between the oil and water. For any given interfacial tension water will occupy to the complete exclusion of oil interstices having less than a maximum effective radius and, accordingly, less than a maximum cross-sectional area. With occupation of these interstices to the complete exclusion of oil, these interstices are not available for the flow of oil and consequently the total cross-sectional area of interstices through which flow of oil can occur is decreased with decrease in production. The presence of emulsions can also impede the flow of oil by restricting the cross-sectional areas of the interstices available for oil flow as well as removing water from the surfaces of the interstices where the effect of the water impeding the flow of the oil would be at a minimum. The solution in oil of the polyoxyethylene ether of nonyl phenol having an oxyethylene chain containing between 1 and 6 moles of ethylene oxide acts, it is believed, to increase petroleum production where restrictions to such production are caused by fluid saturation conditions in the formation about the well bore hole by unique effect on interfacial tension and liquid-solid wettability. The term "mole" is synonymous with "mol" (see Hackh's Chemical Dictionary, page 598, second edition).

The oil solution of the polyoxyethylene ether of nonyl phenol having an oxyethylene chain containing between 1 and 6 moles of ethylene oxide is capable of reducing the interfacial tension between the oil and water in the formation. At the same time, however, the effect on increasing the emulsification of water and oil is at a minimum. But, in conjunction with these effects, it is capable of rendering the formation more water wettable or, where because of composition, to be explained more fully hereinafter, it renders the formation more oil wettable, the emulsification effect is insignificant and its effect on reducing interfacial tension is at a maximum.

The polyoxyethylene ether of nonyl phenol having an oxyethylene chain containing between 1 and 6 moles of ethylene oxide is characterized by the following formula

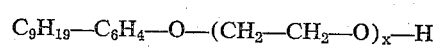

$$C_9H_{19}-C_6H_4-O-(CH_2-CH_2-O)_x-H$$

where the $C_6H_4$ is the benzene nucleus less two hydrogen atoms and $x$ has a value bteween 1 and 6. Polyoxyethylene ethers may be prepared having a desired number of moles of ethylene oxide in the oxyethylene chain. Any particular molecule of polyoxyethylene ether will contain an oxyethylene chain containing a whole number of molecules of ethylene oxide. However, in any batch of polyoxyethylene ether as prepared, not every molecule of the ether will contain the same number of molecules of ethylene oxide in the oxyethylene chain. Thus, in the formula above, the value of $x$ is representative of the average number of molecules of ethylene oxide in the oxyethylene chains of the polyoxyethylene ether.

In the practice of the invention, satisfactory results are obtained where the value of $x$ of the polyoxyethylene ether is between 1 and 6. However, for the treatment of particular subterranean formations selection of more restricted ranges of the value of $x$ may be made based upon the characteristics of the formation and the fluids contained within the formation. For example, with increasing value of $x$ between the limits of 1 and 6, the effect on reduction of the interfacial tension between oil and water becomes greater as the value of $x$ increases from 1 to 6. Further, as the value of $x$ increases between 1 and 6 the effect of changing an oil-wet formation to a water-wet formation becomes greater. The polyoxyethylene ether, since it affects interfacial tension, will have emulsifying tendencies. However, tendency toward emulsification is not observed at the lower values of $x$ between 1 and 6. At the higher values within these limits, the tendency is observed although to a limited extent. On the other hand, as will be observed from what has just been said, it is at these values that the effect of decreasing interfacial tension between oil and water is most pronounced.

It is preferred to employ polyoxyethylene ether having as low a value of $x$ as will effect satisfactory increase in water wettability and decrease in interfacial tension between water and oil. At the lower values of $x$, oil solubility of the ether is greater and thus any tendency of the ether to enter the water phase where its effectiveness would be reduced is at a minimum. Further, at the lower values of $x$, emulsification tendency is also at a minimum.

In a desired mode of operation, the subterranean formation is first subjected to the action of a solution in oil of the polyoxyethylene ether having a given value of $x$ which is preferably a low value of $x$. For example, the ether may have a value of $x$ of 1. The effect of the treatment with the oil solution of this ether is noted. If improvement with respect to increase in the effective permeability to oil of the formation is desired, the formation is treated again to the action of a solution in oil of the polyoxyethylene ether having a greater value of $x$. This process may be repeated as often as desired employing for each treatment ether having a greater value of $x$ than previously used until a desired effect is obtained. Where the subterranean formation is thus treated with a number of ethers of increasing value of $x$, a progressive improvement in effective permeability to oil is obtained which effect is not ordinarily obtained using an equivalent amount of a lesser number of the ethers.

The oil in which the polyoxyethylene ether is dissolved for treatment of a subterranean formation may be any desired oil. The oil may be an animal oil or a vegetable oil. However, it is preferred that the oil be a mineral oil. Suitable mineral oils include petroleum crude oil, diesel oil, fuel oil, or the like.

The amount of polyoxyethylene ether in the oil may vary between 0.1 and 2.5 percent by volume of the oil. However, smaller or larger amounts may be employed. Generally, with increasing amounts of the polyoxyethylene ether, the effect on the formations becomes greater. However, the increase in effect with increase in concentration in the oil of the polyoxyethylene ether becomes less at higher concentrations and a limit is reached where increases in concentration to obtain increases in effect become impractical.

The polyoxyethylene ether being a liquid is readily distributed throughout and dissolved in the oil. The ether may be added to a body of the oil and the mixture stirred to obtain distribution and solution. If desired, the ether may first be dissolved in a comparatively small volume of oil to form a concentrated solution and the solution admixed with the main body of oil to be employed. Distribution and solution of the polyoxyethylene ether may be effected by admixing the ether or a concentrated solution thereof with a moving stream of the oil. For example, the ether or concentrated solution may be admixed with the oil flowing in a pipe by forcing under pressure the ether or concentrated solution in the pipe. The ether or concentrated solution may also be admixed with the oil in or at the entrance to a centrifugal pump. Other suitable means of distribution and solution may also be employed.

The subterranean formation to be treated is subjected to the action of the oil solution by passage of the solution to the formation. Preferably, the well bore hole is first cleaned of drilling fluid or other fluid which would prevent access of the oil solution to the formation or which forced into the formation would have a deleterious effect on oil production. Further, it is preferred to clean the walls of the well bore hole of any mud sheath. Thereafter, the oil solution may be passed through the well bore hole to the formation. The well bore hole may be uncased or cased. In the latter case, of course, the casing must not extend to cover the formation to be treated or must be perforated at the formation. The oil may be passed through the well bore hole through tubing if desired, which tubing may extend entirely or part way to the formation. Suitable packers may be employed, if desired. For example, a packer may be placed in the well bore hole below the formation where the formation is above the bottom of the hole. Where tubing is employed, another packer may be placed in the well bore hole above the bottom of the tubing. When the oil is placed in the well bore hole in contact with the formation, hydrostatic pressure will tend to force the solution into the formation. Where the formation pressure is greater than the hydrostatic pressure of the oil solution, pressure may be applied to the oil in the well bore hole to force it into the formation. Pressure may be applied by pumping or may be applied by placing a liquid having a greater density than the oil solution in the well bore hole or the tubing above the oil solution. Both procedures may be employed simultaneously, if desired. Other suitable measures for applying pressure may also be employed.

Penetration of the oil solution into the formation may be for any distance desired. Preferably, penetration should be effected for the entire distance into the formation that fluid distribution conditions deleteriously affect the production of oil. Under such conditions, maximum benefits will be obtained. However, this distance cannot be readily determined. Accordingly, the desired distance of penetration can only be approximately determined. In any case, the benefits obtained for any distance of penetration effected will be related to those obtained by penetration to the distance that will produce the optimum effect.

Following treatment, the well may be put in production in accordance with conventional practice.

The following example will be illustrative of the invention.

In this example, a core sample was taken from a sandstone formation in Oklahoma, which formation was productive of petroleum oil. This core sample, in the condition it was removed from the formation, was placed in a core sample holder of the type known as a Hassler cell. In this type of core sample holder, a rubber sheath is hydraulically pressed against the longitudinal wall of the core sample to prevent flow of fluid along the longitudinal wall of the sample. Suitable end connections are provided in the cell to contact the core sample for effecting flow of fluid through the core sample and to measure the pressure drop of the fluid flowing through the core sample.

A refined hydrocarbon oil of the type of kerosene and known as Soltrol "C" was passed first through the core sample. Thereafter, an aqueous solution containing 50,000 parts per million of sodium chloride was passed through the core sample in a direction opposite to that given to the oil. The core sample was then oil driven again with the hydrocarbon oil, the oil being passed in the same direction as in the first oil drive. In this second oil drive the pressure differential effecting flow of the oil was five pounds per square inch gauge and oil drive was continued until the water saturation and effective permeability to oil reached equilibrium values. These values were 0.25 and 1.10 millidarcys, respectively.

An oil solution of polyoxyethylene ether of nonyl phenol was then introduced into the core sample. The oil was the same refined hydrocarbon oil employed for the oil drive, the concentration of the ether was one volume percent, and the number of molecules of ethylene oxide in the oxyethylene chain was 4($x=4$). This oil solution was allowed to set in the core sample for 24 hours. Thereafter, the core sample was oil driven employing the hydrocarbon oil free of the polyoxyethylene ether of nonyl phenol and a driving pressure differential of five pounds per square inch. Oil drive was continued until equilibrium conditions of water saturation and effective permeability to oil were established. These values were 0.145 and 9.65 millidarcys, respectively. Accordingly, an increase in effective permeability to oil from 1.10 millidarcys to 9.65 millidarcys was obtained, an increase of 877 percent.

Having thus described my invention, it will be understood that such description has been given by way of illustration and example and not by way of limitation, reference for the latter purpose being had to the appended claims.

I claim:

1. A method for the treatment of a subterranean formation containing petroleum oil and also containing water which is susceptible to emulsification with oil with consequent impedance of the flow of petroleum oil from said formation comprising subjecting said formation to the action of a solution in oil of polyoxyethylene ether of nonyl phenol having an oxyethylene chain containing a given number of moles of ethylene oxide between 1 and 6 and thereafter subjecting said formation to the action of a solution in oil of polyoxyethylene ether of nonyl phenol having an oxyethylene chain containing a number of moles of ethylene oxide between 1 and 6 greater than said given number.

2. A method comprising passing into a subterranean formation containing petroleum oil and also containing water which is susceptible to emulsification with oil with consequent impedance of the flow of petroleum oil from said formation through a well bore hole leading thereto a solution in oil of polyoxyethylene ether of nonyl phenol having an oxyethylene chain containing a given number of moles of ethylene oxide between 1 and 6, thereafter passing into said formation through said well bore hole leading thereto a solution in oil of polyoxyethylene ether of nonyl phenol having an oxyethylene chain containing a number of moles of ethylene oxide between 1 and 6 greater than said given number, and thereafter producing petroleum oil from said formation to said well bore hole.

3. A method comprising passing into a subterranean formation containing petroleum oil and also containing water which is susceptible to emulsification with oil with consequent impedance of the flow of petroleum oil from said formation through a well bore hole leading thereto a solution in oil of polyoxyethylene ether of nonyl phenol having an oxyethylene chain containing one mole of ethylene oxide, said solution containing between about 0.1 and 2.5 percent by volume of said ether, thereafter passing into said formation through said well bore hole leading thereto a solution in oil of polyoxyethylene ether of nonyl phenol having an oxyethylene chain containing a number of moles of ethylene oxide between 1 and 6 greater than said given number, said solution containing between about 0.1 and 2.5 percent by volume of said ether, and thereafter producing petroleum oil from said formation to said well bore hole.

4. A method comprising passing into a subterranean formation containing petroleum oil and also containing water which is susceptible to emulsification with oil with consequent impedance of the flow of petroleum oil from said formation through a well bore hole leading thereto a solution in oil of polyoxyethylene ether of nonyl phenol having an oxyethylene chain containing one mole of ethylene oxide, thereafter passing into said formation through said well bore hole leading thereto a solution in oil of polyoxyethylene ether of nonyl phenol having an oxyethylene chain containing more than one but not greater than 6 moles of ethylene oxide, and thereafter producing petroleum oil from said formation to said well bore hole.

5. A method comprising passing into a subterranean formation containing petroleum oil and also containing water which is susceptible to emulsification with oil with consequent impedance of the flow of petroleum oil from said formation through a well bore hole leading thereto a solution in oil of polyoxyethylene ether of nonyl phenol having an oxyethylene chain containing one mole of ethylene oxide, said solution containing between about 0.1 and 2.5 percent by volume of said ether, thereafter passing into said formation through said well bore hole leading thereto a solution in oil of polyoxyethylene ether of nonyl phenol having an oxyethylene chain containing more than one but not greater than 6 moles of ethylene oxide, said solution containing between about 0.1 and 2.5 percent by volume of said ether, and thereafter producing petroleum oil from said formation to said well bore hole.

6. A method comprising passing into a subterranean formation containing petroleum oil and also containing water which is susceptible to emulsification with oil with consequent impedance of the flow of petroleum oil from said formation through a well bore hole leading thereto a solution in oil of polyoxyethylene ether of nonyl phenol having an oxyethylene chain containing a given number of moles of ethylene oxide between 1 and 6, thereafter passing into said formation through said well bore hole leading thereto a solution in oil of polyoxyethylene ether of nonyl phenol having an oxyethylene chain containing a given number of moles of ethylene oxide not greater than 6 but greater than said first mentioned given number, thereafter repeating the step of passing into said formation through said well bore hole a solution in oil of polyoxyethylene ether of nonyl phenol having an oxyethylene chain containing a given number of moles of ethylene oxide not greater than 6 but greater than the given number of moles of ethylene oxide in the polyoxyethylene ether of nonyl phenol employed in the next previous step for such number of times that increase in the effective permeability of said formation in the vicinity of said well bore hole to petroleum oil is obtained, and thereafter producing petroleum oil from said formation to said well bore hole.

7. A method comprising passing into a subterranean formation containing petroleum oil and also containing water which is susceptible to emulsification with oil with consequent impedance of the flow of petroleum oil from said formation through a well bore hole leading thereto a solution in oil of polyoxyethylene ether of nonyl phenol having an oxyethylene chain containing a given number of moles of ethylene oxide between 1 and 6, said solution containing between about 0.1 and 2.5 percent by volume of said ether, thereafter passing into said formation through said well bore hole leading thereto a solution in oil of polyoxyethylene ether of nonyl phenol having an oxyethylene chain containing a given number of moles of ethylene oxide not greater than 6 but greater than said first mentioned given number, said solution containing between about 0.1 and 2.5 percent by volume of said ether, thereafter repeating the step of passing into said formation through said well bore hole a solution in oil of polyoxyethylene ether of nonyl phenol having an oxyethylene chain containing a given number of moles of ethylene oxide not greater than 6 but greater than the given number of moles of ethylene oxide in the polyoxyethylene ether of nonyl phenol employed in the next previous step for such number of times that increase in the effective permeability of said formation in the vicinity of said well bore hole to petroleum oil is obtained, each of said solutions containing between about 0.1 and 2.5 percent by volume of said ether, and thereafter producing petroleum oil from said formation to said well bore hole.

8. The method for treating an oil-bearing formation penetrated by a well and containing water which is susceptible to emulsification with oil with consequent impedance of the flow of oil from said formation into said well comprising injecting into said well and then into said formation two treating solutions in sequence, one treating solution being an oil solution containing a major portion of oil by volume, and from about 0.2 to about 1 percent by weight of the reaction product of from 3.5 to about 5.0 mols of ethylene oxide with about one mol of nonyl phenol, and the other treating solution being an oil solution containing a major portion of oil by volume, and at least about 0.2 percent by weight of the reaction product of from about 2 to about 3.5 mols of ethylene oxide with about one mol of nonyl phenol.

References Cited in the file of this patent

UNITED STATES PATENTS

| | | |
|---|---|---|
| 2,164,459 | Kennedy | July 4, 1939 |
| 2,233,381 | De Groote et al. | Feb. 25, 1941 |
| 2,465,237 | Larsen | Mar. 22, 1949 |
| 2,606,871 | Ten Brink | Aug. 12, 1952 |
| 2,874,779 | Johnson | Feb. 24, 1959 |